United States Patent
Park et al.

(10) Patent No.: US 7,191,653 B2
(45) Date of Patent: Mar. 20, 2007

(54) TUNING FORK VIBRATORY MEMS GYROSCOPE

(75) Inventors: Kyoo Yeon Park, Suwon (KR); Yong Sik Kim, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 5 days.

(21) Appl. No.: 11/070,223

(22) Filed: Mar. 3, 2005

(65) Prior Publication Data

US 2006/0117852 A1    Jun. 8, 2006

(30) Foreign Application Priority Data

Dec. 3, 2004   (KR)   .................... 10-2004-0100878

(51) Int. Cl.
*G01P 9/04*   (2006.01)
(52) U.S. Cl. ................................ 73/504.12; 73/504.16; 73/504.14
(58) Field of Classification Search ............ 73/504.04, 73/504.12, 504.14, 504.16
See application file for complete search history.

(56) References Cited

U.S. PATENT DOCUMENTS

| | | | |
|---|---|---|---|
| 5,349,855 A | | 9/1994 | Bernstein et al. |
| 5,747,690 A | | 5/1998 | Park et al. |
| 6,415,663 B1 | * | 7/2002 | Mochida et al. ......... 73/504.12 |
| 6,742,390 B2 | * | 6/2004 | Mochida et al. ......... 73/504.14 |
| 6,786,094 B2 | * | 9/2004 | Konaka et al. .......... 73/504.14 |
| 6,845,666 B2 | * | 1/2005 | Mochida .................. 73/504.12 |
| 6,860,150 B2 | * | 3/2005 | Cho ........................ 73/504.12 |
| 6,915,693 B2 | * | 7/2005 | Kim et al. ............... 73/504.12 |
| 7,004,024 B1 | * | 2/2006 | Park ........................ 73/504.16 |
| 7,051,591 B2 | * | 5/2006 | Chaumet et al. ......... 73/504.12 |
| 2006/0037396 A1 | * | 2/2006 | Nicu et al. ............... 73/504.12 |

FOREIGN PATENT DOCUMENTS

JP    2004205492    7/2004

* cited by examiner

*Primary Examiner*—Helen Kwok
(74) *Attorney, Agent, or Firm*—Lowe Hauptman & Berner

(57) ABSTRACT

A tuning fork vibratory MEMS gyroscope for sensing angular velocity and angular acceleration generated due to the rotation of a movable body. The tuning fork vibratory MEMS gyroscope includes an external fixed support portion formed on a substrate; a plurality of external elastic members; first and second external frames respectively including driving combs; first and second driving electrodes respectively including comb drivers; first and second internal elastic members respectively including a plurality of spring members; first and second internal frames respectively including sensing combs; and first and second sensing electrodes respectively including comb sensors. The tuning fork vibratory MEMS gyroscope withstands a noise at a peripheral area, is driven at the external portions of internal frames, is sensed at the internal portions of the internal frames, and comprises the elastic members having a wine glass shape, thereby being more stably operated.

33 Claims, 13 Drawing Sheets

Unstable deformation is rarely generated in turning fork mode

TUNING FORK VIBRATORY MEMS GYROSCOPE

RELATED APPLICATION

The present application is based on, and claims priority from, Korean Application No. 2004-100878, filed on Dec. 3, 2004, the disclosure of which is incorporated by reference herein in its entirety.

BACKGROUND OF THE INVENTION

1. Field of the Invention

The present invention relates to a Micro Electro-Mechanical System (MEMS) gyroscope for sensing angular velocity and angular acceleration generated due to the rotation of a movable body, and more particularly to a tuning fork vibratory MEMS gyroscope, withstanding a noise at a peripheral area, which is driven at external portions of internal frames, is sensed at internal portions of the internal frames, and comprises elastic members having a wine glass shape, thereby being more stably operated.

2. Description of the Related Art

Generally, gyroscopes are used as sensors for sensing angular velocity or angular acceleration generated due to the rotation of a movable body. The gyroscopes are divided into mechanical gyroscopes and vibratory gyroscopes according to types of force applied thereto, and divided into ceramic gyroscopes and MEMS gyroscopes, using a semiconductor manufacturing process, according to types of manufacturing process. Further, the vibratory gyroscopes are divided into lateral gyroscopes and vertical gyroscopes according to directions of the applied force. Here, the lateral gyroscope uses Coriolis' force applied in a direction horizontal with the horizontal plane of velocity, and the vertical gyroscope uses Coriolis' force applied in a direction vertical to the horizontal plane of velocity.

The above Coriolis' force, used by the vibratory gyroscopes, is obtained by the equation "Fc=2 mΩ·V". Here, "m" represents the weight of a movable body, "Ω" represents angular velocity, and "V" represents velocity. The direction of the Coriolis' force (Fc) is determined by an axis of the velocity (V) and a rotary axis of the angular velocity (Ω). The vibratory gyroscopes are applied to apparatuses for sensing vibration (for example, hand trembling) and compensating for the vibration.

The vibratory gyroscope comprises stationary structures and vibratory structures. The stationary structures include driving structures and sensing structures. The driving structures serve to resonate the vibratory structures by means of magnetic oscillation for forming sensing conditions in a driving mode, and the sensing structures serve to resonate the vibratory structures by means of the Coriolis' force (Fc) applied in the direction perpendicular to the angular velocity or the angular acceleration corresponding to the movement of a movable body (for example, hand-held trembling of a digital camera). The direction of resonance of the vibratory structures in the driving mode and the direction of resonance of the vibratory structures in the sensing mode are perpendicular to each other. Here, the size of a capacitor according to the degree of the Coriolis' force (Fc), i.e., the degree of the trembling of the movable body, is measured.

In the sensing mode of the gyroscope, detection of the voltage of the gyroscope is achieved by a method for measuring capacitance corresponding to the Coriolis' force and then converting the capacitance into voltage, and a rebalance method for measuring voltage required to suppress movement caused by the Coriolis' force.

In order to improve a sensing capacity of the above vibratory gyroscope, the movement of the gyroscope must be large in the driving mode and the sensitivity of the gyroscope must be excellent.

The vibratory gyroscope is applied to an apparatus for preventing a camcorder from trembling, a roll-over airbag for vehicles, a toy pilotless airplane, and a head mount display (HMD).

In the case that the vibratory gyroscope, serving as a sensor for measuring angular velocity in a designated direction, is applied to the above-described apparatuses, the vibratory gyroscope needs to be insensitive to angular velocities or movements in other directions, not to be measured. The sensitivity to the above movements in other directions, not to be measured, is defined as "cross talk" or "cross sensitivity". Sensors for measuring physical quantities must minimize their cross sensitivity, and limit the cross sensitivity to a designated value defined in their specifications.

U.S. Pat. No. 5,747,690A discloses a conventional micro gyroscope. The above-disclosed micro gyroscope is driven using combs aligned in the horizontal direction of the X-axis, and the vibration of the micro gyroscope generated by the Coriolis' force in the direction of the vertical direction of the Y-axis is sensed using sensing electrodes. That is, in the case that a suspended weight is vibrated in the direction of the X-axis by applying AC current to the combs formed on both surfaces of the suspended weight, when an angular velocity in the direction of the Z-axis is applied, the weight is vibrated at a vibrating frequency by the Coriolis' force in the direction of the Y-axis. Here, the vibrating range of the weight is in direct proportion to the applied angular velocity, and the vibrating frequency of the vibration of the weight in the direction of the Y-axis is detected using the sensing electrodes. Thereby, an angular velocity signal is obtained.

In the driving mode of the above conventional horizontal micro gyroscope, the weight is initially vibrated in the direction of the X-axis, and is then vibrated in the direction of the Y-axis due to the Coriolis' force generated by the external angular velocity applied thereto, thereby sensing an angular velocity. When the angular velocity is detected by the above method, the vibration is transmitted in the directions of the X-axis and Y-axis, particularly in the direction of the sensitive Y-axis, thereby being directly outputted. There is a component, which is weak to a vibration close to a characteristic vibration frequency out of external vibrations, and is modulated by a signal of the characteristic vibration frequency (resonant frequency) to generate an angular velocity signal, while vibrations at other frequency bands are decreased using an electrical filter. The component cannot be electrically offset, thereby deteriorating the sensing capacity of the gyroscope.

U.S. Pat. No. 5,349,855A discloses a conventional tuning fork micro gyroscope. The above-disclosed tuning fork micro gyroscope uses a tuning fork vibrating mode. In the tuning fork mode, the sensing is performed in the direction vertical to the ground surface. This micro gyroscope comprises a structure, which performs a driving mode in the horizontal direction and a sensing mode in the vertical direction. When frequencies in the above two directions are the same, the above structure generates the highest output. Accordingly, after the manufacturing process of the gyroscope, a tuning process, in which the two resonant frequencies in the horizontal and vertical directions are set to similar values or the same value through an electrical step, is performed.

When the two resonant frequencies in the horizontal and vertical directions are set to the same value, since the directions of sensing and driving modes are respectively horizontal and vertical, elastic bodies, such as springs, vibrated in the horizontal and vertical directions must have the same height and thickness, thereby causing a difficulty in performing the frequency-tuning process. Since the frequency in the horizontal direction is sensitive to an etching process of the structure and the frequency in the vertical direction is determined by a depositing, plating, or polishing process determining the thickness of the structure, the two processes must be carefully controlled. However, it is difficult to substantially control the processes. Further, since a sensing electrode is formed biased to one side, a high angular velocity is applied to the sensing electrode to increase the degree of the vibration of the weight in the vertical direction, thereby causing nonlinearity in measurement.

As described above, in the conventional gyroscopes, external vibration or noise is transmitted to structures of the gyroscope, thereby increasing signals other than the signal regarding the angular velocity. The above generation of abnormal signals has a negative influence on functions of products employing the gyroscopes.

In order to solve the above conventional problems, a horizontal and tuning fork vibratory gyroscope, as shown in FIG. 1, is proposed.

FIG. 1 is a plan view of a conventional horizontal and tuning fork vibratory gyroscope.

With reference to FIG. 1, the conventional horizontal and tuning fork vibratory gyroscope comprises a substrate 105, a fixed portion 110, an external elastic member 120, an external frame portion 130, a sensing electrode portion 140, an internal elastic member 150, an internal mass portion 160 having a pair of first and second internal weights respectively including driving combs, and a driving electrode portion 170 including a comb driver.

Here, when a driving signal is supplied to the driving electrode portion 170, electrostatic force is generated between the driving electrode portion 170 and the internal mass portion 160, thereby driving the first and second internal weights, which face each other in the Y-axis direction, of the internal mass portion 160 to a horizontal tuning fork mode such that that the first and second internal weights reciprocate so as to be close to and distant from each other.

When the gyroscope of FIG. 1 generates angular velocity having a rotary axis vertical to the X and Y axes, a pair of the internal weights are vibrated by Coriolis' forces in reverse directions along the X axis, and the vibration of the internal weights is transmitted to the external frame portion 130 through the internal electric member 150, thereby causing the external frame portion 130 to be vibrated.

In this case, the sensing electrode portion 140 detects capacitance corresponding to a variation in an interval between the external frame portion 130 and the sensing electrode portion 140, thereby sensing the degree of external force or its self vibration.

Japanese Patent Laid-open Publication No. 2004-205492 discloses the detailed description of the above horizontal and tuning fork vibratory gyroscope.

The above conventional turning fork vibratory gyroscope is operated in a horizontal mode, in which a resonance direction of a sensing mode and a resonance direction of a driving mode are on the same plane, and is insensible to a variation in the thickness in the vertical direction determined in a manufacturing process, thereby being advantageous in that sensing characteristics of the gyroscope are improved.

However, the conventional horizontal and tuning fork vibratory gyroscope as shown in FIG. 1 has several problems, as follows.

FIG. 2 is a schematic view illustrating a "π"-shaped spring in the tuning fork mode of the gyroscope of FIG. 1.

With reference to FIGS. 1 and 2, the external frame portion 130 and the first and second internal weights of the internal mass portion 160 of the conventional horizontal and tuning fork vibratory gyroscope are connected by "π"-shaped springs. When the gyroscope is operated in the tuning fork mode, a body portion of the "π"-shaped spring, as shown in FIG. 2, is unstably deformed, thereby causing unstable tuning fork operation of the gyroscope. More severely, the unstable deformation of the body portion of the "π"-shaped spring causes abnormal oscillation of the gyroscope.

Further, since the conventional horizontal and tuning fork vibratory gyroscope, as shown in FIG. 1, comprises a plurality of small elements, which must be precisely finished, it is difficult to manufacture the conventional horizontal and tuning fork vibratory gyroscope and manufacturing the conventional horizontal and tuning fork vibratory gyroscope is costly. Particularly, since the above gyroscope comprises plural mechanical elements, it is difficult to apply gyroscope to an integrated circuit-type product.

SUMMARY OF THE INVENTION

Therefore, the present invention has been made in view of the above problems, and it is an object of the present invention to provide a horizontal and tuning fork vibratory MEMS gyroscope for sensing angular velocity and angular acceleration generated due to the rotation of a movable body, which withstands a noise at a peripheral area, and is driven at external portions of internal frames and sensed at internal portions of the internal frames.

It is another object of the present invention to provide a horizontal and tuning fork vibratory MEMS gyroscope using elastic members having a wine glass shape, thereby being more stably operated.

It is yet another object of the present invention to provide a horizontal and tuning fork vibratory MEMS gyroscope using a feedback electrode installed in a space between the elastic members having a wine glass shape to increase the efficiency of a usable space, thereby having a reduced size.

In accordance with the present invention, the above and other objects can be accomplished by the provision of a tuning fork vibratory MEMS gyroscope comprising: an external fixed support portion formed on a substrate having a flat structure in a horizontal direction by the X-axis and the Y-axis, which meet at a right angle; a plurality of external elastic members connected to the inner sides of the external fixed support portion, and having elasticity in the direction of the Y-axis; first and second external frames separated from the substrate by a designated interval, elastically supported by the plural external elastic members, disposed on the Y-axis such that the first and second external frames are separated from each other, and respectively including driving combs, having a designated length in the direction of the Y-axis, at a part of the inner sides thereof; first and second driving electrodes fixed to the substrate, respectively disposed inside the first and second external frames such that the first and second driving electrodes are separated from the inner sides of the first and second external frames, and respectively including comb drivers separated from the corresponding driving combs and engaged with the corresponding driving combs; first and second internal elastic members respectively connected to the inner sides of the first and second external frames, and having elasticity in the direction of the X-axis; first and second internal frames separated from the substrate by a designated interval, respectively disposed inside the first and second external frames such that the first and second internal frames are separated from the inner sides of the first and second external frames, elastically supported by the first and second internal elastic members, and respectively including sensing combs, having a designated length in the direction of the Y-axis, at a part of the inner sides thereof; and first and second sensing electrodes fixed to the substrate, respectively disposed inside the first and second internal frames such that the first and second sensing electrodes are separated from the inner sides of the first and second internal frames, and respectively including comb sensors separated from the corresponding sensing combs by a designated interval and engaged with the corresponding sensing combs.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
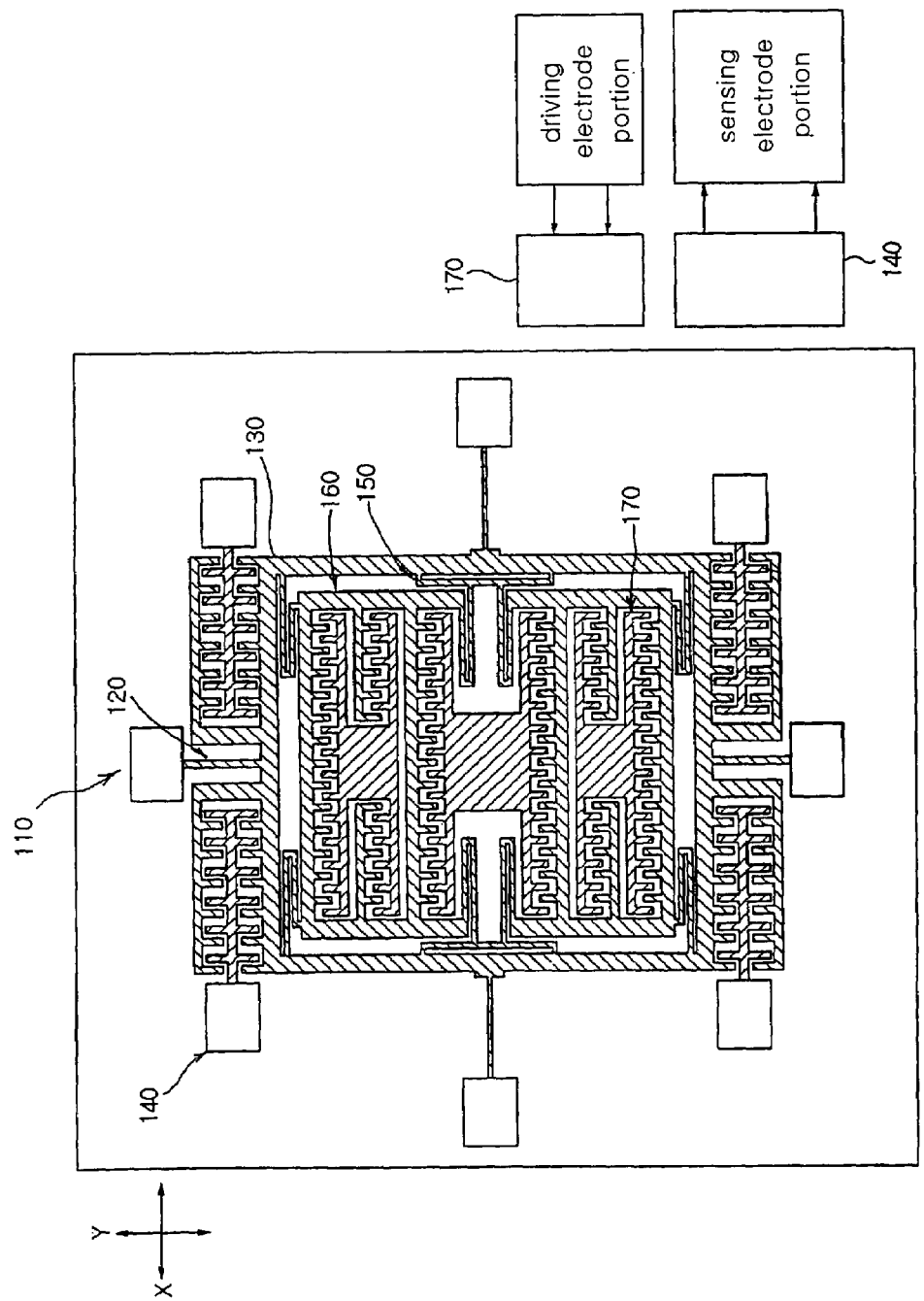
FIG. 1 is a plan view of a conventional horizontal and tuning fork vibratory gyroscope.

Now, a preferred embodiment of the present invention will be described in detail with reference to the annexed drawings.

In the drawings, the same or similar elements are denoted by the same reference numerals even though they are depicted in different drawings.

A tuning fork vibratory MEMS gyroscope of the present invention uses a tuning fork mode, which is insensitive to external impact, such as a noise at a peripheral area, and comprises external elastic members having a wine glass shape so as to be more stably vibrated in the tuning fork mode, and a feedback electrode formed in a space between the wine glass-shaped external elastic members so as to improve space utility and to be reduced in size.

Particularly, in the tuning fork vibratory MEMS gyroscope of the present invention, external frames and internal frames are elastically supported by a plurality of external elastic members and a plurality of internal elastic members, and are vibrated under the condition that the external and internal frames are separated from a substrate by a designated interval, and vibrating modes and resonant frequencies of the external and internal frames are determined by adjusting the sizes and densities of the external and internal frames and the stiffness of the elastic members.

Further, the shapes of the external elastic members fixed to the substrate and connected to the external frames, the shapes of the internal elastic members connected to the external frames for connecting internal frames thereto, and more particularly the shapes of the wine glass-shaped elastic members connecting the substrate and the external frames at the central part of the substrate for generating the turning fork mode are important characteristics of the tuning fork vibratory MEMS gyroscope of the present invention. Hereinafter, a preferred embodiment of the above configuration of the tuning fork vibratory MEMS gyroscope of the present invention will be described in detail.

FIG. 3A is an overall plan view of a tuning fork vibratory MEMS gyroscope in accordance with the present invention, and FIG. 3B is a sectional view taken along the ling A1–A2 of FIG. 3A.

With reference to FIGS. 3A and 3B, the tuning fork vibratory MEMS gyroscope of the present invention comprises an external fixed support portion 220, external elastic members 310 to 360, first and second external frames 410 and 420, first and second driving electrodes 510 and 520, and first and second internal elastic members 610 and 620, first and second internal frames 710 and 720, and first and second sensing electrodes 810 and 820. The tuning fork vibratory MEMS gyroscope of the present invention further comprises a feedback electrode 900.

With reference to FIGS. 3A and 3B, the external fixed support portion 220 is formed on a substrate 210 having a flat structure in a horizontal direction by the X-axis and the Y-axis, which meet at a right angle. An inner space having a rectangular shape is formed by the external fixed support portion 220, and driving and sensing structures are disposed in the inner space. The external fixed support portion 220 will be described later in detail, with reference to FIG. 4.

The external elastic members 310 to 360 are connected to the inner sides of the external fixed support portion 220, and have elasticity in the direction of the Y-axis. Here, the external elastic members 310 to 360 have elasticity in the direction of the Y-axis, but rarely have elasticity in the direction of the X-axis, so that the first and second external frames 410 and 420 can be vibrated in the direction of the Y-axis.

Accordingly, the above structure allows the first and second external frames 410 and 420 connected to the external elastic members 310 to 360 to be vibrated in the direction of the Y-axis, and prevents the first and second external frames 410 and 420 from being vibrated in the direction of the X-axis. The external elastic members 310 to 360 will be described later in detail, with reference to FIGS. 5 and 6.

The first external frame 410 is separated from the substrate 210 by a designated interval, and is elastically supported by the plural external elastic members 310 to 360. Further, the first external frame 410 is disposed on an upper portion of the Y-axis, and includes a driving comb 415, having a designated length in the direction of the Y-axis, at a part of the inner surface thereof.

The second external frame 420 is separated from the substrate 210 by a designated interval, and is elastically supported by the plural external elastic members 310 to 360. Further, the second external frame 420 is disposed on a lower portion of the Y-axis such that the second external frame 420 is separated from the first external frame 410, and includes a driving comb 425, having a designated length in the direction of the Y-axis, at a part of the inner surface thereof. The above first and second external frames 410 and 420 will be described later in detail, with reference to FIG. 7.

The first driving electrode 510 is fixed to the substrate 210 and disposed inside the first external frame 410 such that the first driving electrode 510 is separated from the inner sides of the first external frame 410, and includes a comb driver 515, which is separated from the driving comb 415 of the first external frame 410 and engaged with the driving comb 415.

The second driving electrode 520 is fixed to the substrate 210 and disposed inside the second external frame 420 such that the second driving electrode 520 is separated from the inner sides of the second external frame 420, and includes a driver 525, which is separated from the driving comb 425 of the second external frame 420 and engaged with the driving comb 425.

The above first and second driving electrodes 510 and 520 will be described later in detail, with reference to FIG. 8.

Here, the term "comb" is defined as an element having a comb structure, in which a plurality of fingers are repeatedly arranged in a line, and the term "comb driver" is defined as an element having the same comb structure as that of the comb, in which a plurality of fingers are repeatedly arranged in a line.

When a driving signal from a driving circuit unit (not shown) is applied to the first and second driving electrodes 510 and 520, electrostatic force due to an electrical potential difference is generated between the comb drivers 515 and 525 of the first and second driving electrodes 510 and 520 and the driving combs 415 and 425 of the first and second external frames 410 and 420, and drives the first and second external frames 410 and 420 under the condition that the first and second external frames 410 and 420 are elastically supported by the external elastic members 310 to 360, thereby vibrating the first and second external frames 410 and 420 in a tuning fork mode, in which the comb drivers 515 and 525 of the first and second driving electrodes 510 and 520 and the driving combs 415 and 425 of the first and second external frames 410 and 420 are close to and distant from each other in the reverse directions along the Y-axis.

Further, with reference to FIGS. 3A and 3B, the first internal elastic member 610 is connected to the inner sides of the first external frame 410, and has elasticity in the direction of the X-axis while rarely having elasticity in the direction of the Y-axis. Accordingly, the first internal frame 710 is linked with the vibration of the first external frame 410 in the direction of the Y-axis by the first internal elastic member 610, thus being vibrated in the direction of the Y-axis.

The second internal elastic member 620 is connected to the inner sides of the second external frame 420, and has elasticity in the direction of the X-axis while rarely having elasticity in the direction of the Y-axis. Accordingly, the second internal frame 720 is linked with the vibration of the second external frame 420 in the direction of the Y-axis by the second internal elastic member 620, thus being vibrated in the direction of the Y-axis.

The above first and second internal elastic members 610 and 620 will be described later in detail, with reference to FIG. 9.

When the first and second external frames 410 and 420 are vibrated in the direction of the Y-axis in the tuning fork mode, the first and second internal frames 710 and 720, which are linked with the first and second external frames 410 and 420 by the first and second internal elastic members 610 and 620, are vibrated in the direction of the Y-axis in the tuning fork mode.

The first internal frame 710 is separated from the substrate 210 by a designated interval and disposed inside the first external frame 410 such that the first internal frame 710 is separated from the inner sides of the first external frame 410, is elastically supported by the first internal elastic member 610, and includes a sensing comb 715, having a designated length in the direction of the Y-axis, formed therein.

The second internal frame 720 is separated from the substrate 210 by a designated interval and disposed inside the second external frame 420 such that the second internal frame 720 is separated from the inner sides of the second external frame 420, is elastically supported by the second internal elastic member 620, and includes a sensing comb 725, having a designated length in the direction of the Y-axis, formed therein.

The above first and second internal frames 710 and 720 will be described later in detail, with reference to FIG. 10.

When the first and second internal frames 710 and 720 are vibrated in the direction of the Y-axis in the tuning fork mode, the tuning fork vibratory MEMS gyroscope of the present invention generates acceleration and/or angular velocity of a rotary axis perpendicular to the X-axis or the Y-axis. Then, the first and second internal frames 710 and 720 are vibrated by Coriolis' forces in reverse directions along the X-axis. That is, the first and second internal frames 710 and 720 respectively move from the center of the substrate 210 in reverse directions along the X-axis in proportion to secondary resonant frequency.

The vibration of the first and second internal frames 710 and 720 is sensed by the first and second sensing electrodes 810 and 820, which will be described later.

With reference to FIGS. 3A and 3B, the first sensing electrode 810 is fixed to the substrate 210 and disposed inside the first internal frame 710 such that the first sensing electrode 810 is separated from the inner sides of the first internal frame 710, and includes a comb sensor 815, which is separated from the sensing comb 715 by a designated interval and engaged with the sensing comb 715.

The second sensing electrode 820 is fixed to the substrate 210 and disposed inside the second internal frame 720 such that the second sensing electrode 820 is separated from the inner sides of the second internal frame 720, and includes a comb sensor 825, which is separated from the sensing comb 725 by a designated interval and engaged with the sensing comb 725.

The above first and second sensing electrodes 810 and 820 will be described later in detail, with reference to FIG. 11.

When the first and second internal frames 710 and 720 are vibrated in reverse directions along the X-axis, as described above, capacitances, corresponding to variations of intervals between the sensing combs 715 and 725 of the first and second internal frames 710 and 720 and the comb sensors 815 and 825 of the first and second sensing electrodes 810 and 820, i.e., the vibrations of movable bodies, are sensed by the first and second sensing electrodes 810 and 820.

Hereinafter, elements of the MEMS gyroscope of the present invention will be described in more detail, with reference to FIGS. 4 to 13.

Figure 4:
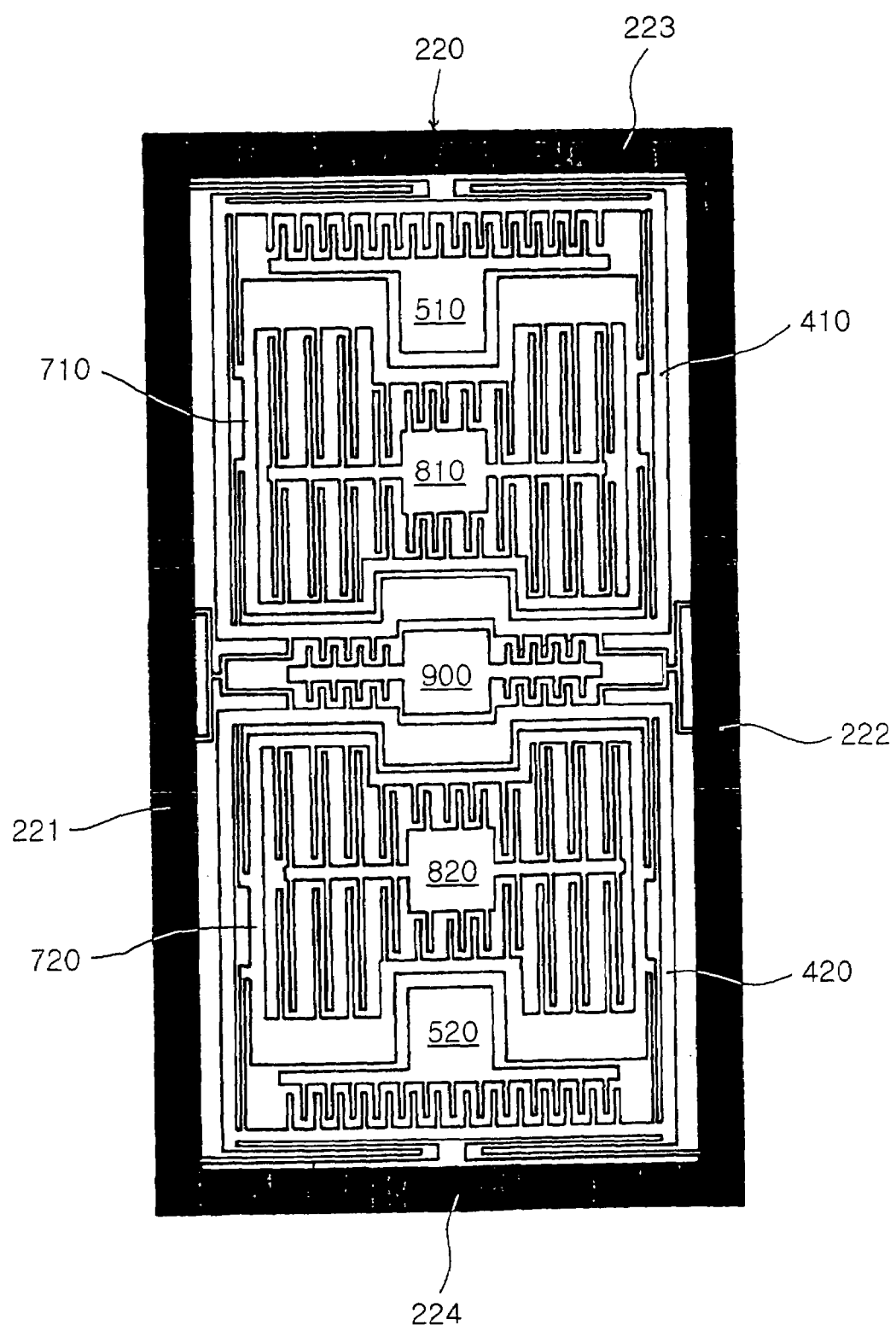
FIG. 4 is a plan view of an external fixed support portion of the MEMS gyroscope of the present invention.

FIG. 4 is a plan view of the external fixed support portion of the MEMS gyroscope of the present invention.

With reference to FIG. 4, the external fixed support portion 220 includes first and second Y-axis frame bars 221 and 222, which are aligned in parallel in the direction of the Y-axis, and are separated from each other, and first and second X-axis frame bars 223 and 224, which are connected to both ends of the first and second Y-axis frame bars 221 and 222, are aligned in parallel in the direction of the X-axis, and are separated from each other.

The inner space having a rectangular shape is prepared by the first and second Y-axis frame bars 221 and 22 and the first and second X-axis frame bars 223 and 224 of the external fixed support portion 220. Driving structures, such as the first and second driving electrodes 510 and 520 and the first and second external frames 410 and 420, and sensing structures, such as the first and second sensing electrodes 810 and 820 and the first and second internal frame 710 and 720, are disposed in the inner space.

Figure 5:
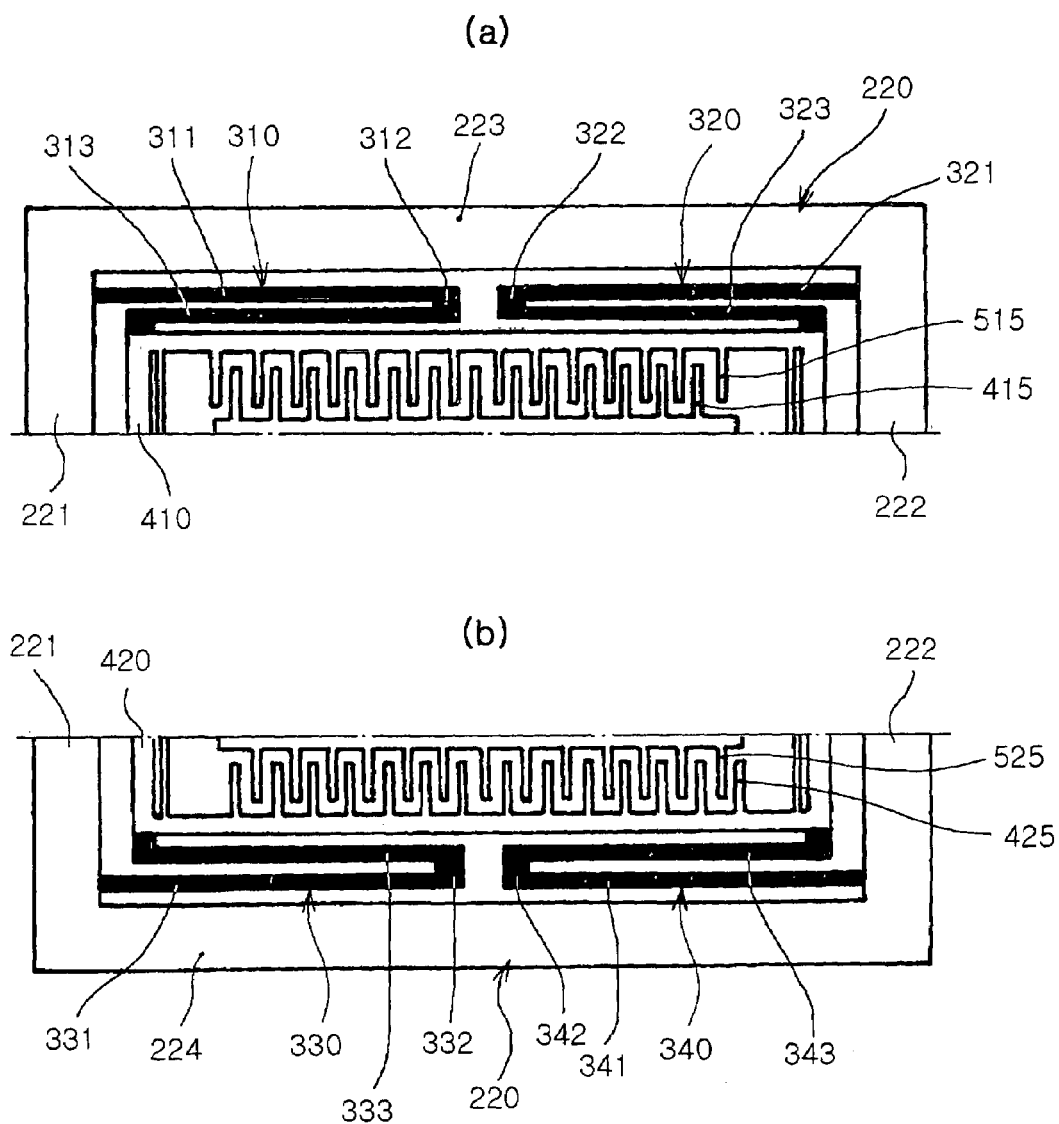
FIGS. 5A and 5B are enlarged views of first to fourth external elastic members of the MEMS gyroscope of the present invention.
Figure 6:
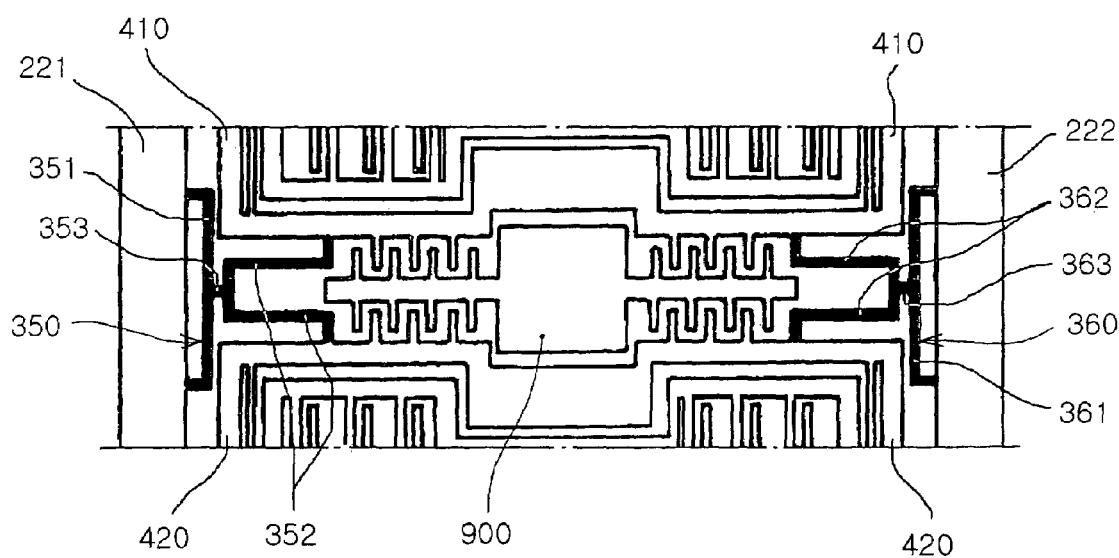
FIG. 6 is an enlarged view of fifth and sixth external elastic members of the MEMS gyroscope of the present invention.

FIGS. 5A and 5B are enlarged views of first to fourth external elastic members of the MEMS gyroscope of the present invention, and FIG. 6 is an enlarged view of fifth and sixth external elastic members of the MEMS gyroscope of the present invention.

With reference to FIGS. 4 to 6, the plural external elastic members consist of the first to sixth external elastic members 310 to 360.

With reference to FIGS. 5A and 5B, the first and second external elastic members 310 and 320 are respectively made of elastic bars having a designated length in the direction of the X-axis, ends of which are connected to the inner side of the external fixed support portion 220 and the other ends of which are connected to the first external frame 410.

The third and fourth external elastic members 330 and 340 are respectively made of elastic bars having a designated length in the direction of the X-axis, ends of which are connected to the inner side of the external fixed support portion 220 and the other ends of which are connected to the second external frame 420.

With reference to FIG. 6, the fifth external elastic member 350 is made of an elastic body having a right-laid wine glass shape, both ends of a left side of which are connected to a central part of the inner surface of the first Y-axis frame bar 221 of the external fixed support portion 220 and both ends of a right side of which are respectively connected to the first and second external frames 410 and 420.

The sixth external elastic member 360 is made of an elastic body having a left-laid wine glass shape, both ends of a right side of which are connected to a central part of the inner surface of the second Y-axis frame bar 222 of the external fixed support portion 220 and both ends of a left side of which are respectively connected to the first and second external frames 410 and 420.

With reference to FIG. 5A, the first external elastic member 310 includes a first X-axis bar 311, one end of which is connected to the upper end of the inner surface of the first Y-axis frame bar 221 of the external fixed support portion 220 and extended by a designated length in the direction of the X-axis, a bending portion 312, which bends downwardly from the other end of the first X-axis bar 311, and a second X-axis bar 313, which is connected to the bending portion 312, is extended by a designated length in the direction of the X-axis, and is then connected to the upper end of the left side of the first external frame 410. Here, the length of the first and second X-axis bars 311 and 313 is larger than that of the bending portion 312 along the Y-axis, thereby allowing the first external frame 410 to be efficiently vibrated in the direction of the Y-axis.

The second external elastic member 320 includes a first X-axis bar 321, one end of which is connected to the upper end of the inner surface of the second Y-axis frame bar 222 of the external fixed support portion 220 and extended by a designated length in the direction of the X-axis, a bending portion 322, which bends downwardly from the other end of the first X-axis bar 321, and a second X-axis bar 323, which is connected to the bending portion 322, is extended by a designated length in the direction of the X-axis, and is then connected to the upper end of the right side of the first external frame 410. Here, the length of the first and second X-axis bars 321 and 323 is larger than that of the bending portion 322 along the Y-axis, thereby allowing the first external frame 410 to be efficiently vibrated in the direction of the Y-axis.

Preferably, the first and second external elastic members 310 and 320 have symmetrical structures with each other with respect to the Y-axis so that the first and second external elastic members 310 and 320 cooperate with the fifth and sixth external elastic members 350 and 360, which will be described later, thereby allowing the first external frame 410 to be horizontally well-balanced when the first external frame 410 is vibrated in the tuning fork mode.

With reference to FIG. 5B, the third external elastic member 330 includes a first X-axis bar 331, one end of which is connected to the lower end of the inner surface of the first Y-axis frame bar 221 of the external fixed support portion 220 and extended by a designated length in the direction of the X-axis, a bending portion 332, which bends upwardly from the other end of the first X-axis bar 331, and a second X-axis bar 333, which is connected to the bending portion 332, is extended by a designated length in the direction of the X-axis, and is then connected to the lower end of the left side of the second external frame 420. Here, the length of the first and second X-axis bars 331 and 333 is larger than that of the bending portion 332 along the Y-axis, thereby allowing the second external frame 420 to be efficiently vibrated in the direction of the Y-axis.

The fourth external elastic member 340 includes a first X-axis bar 341, one end of which is connected to the lower end of the inner surface of the second Y-axis frame bar 222 of the external fixed support portion 220 and extended by a designated length in the direction of the X-axis, a bending portion 342, which bends upwardly from the other end of the first X-axis bar 341, and a second X-axis bar 343, which is connected to the bending portion 342, is extended by a designated length in the direction of the X-axis, and is then connected to the lower end of the right side of the second external frame 420. Here, the length of the first and second X-axis bars 341 and 343 is larger than that of the bending portion 342 along the Y-axis, thereby allowing the second external frame 420 to be efficiently vibrated in the direction of the Y-axis.

Preferably, the third and fourth external elastic members 330 and 340 have symmetrical structures with each other with respect to the Y-axis so that the third and fourth external elastic members 330 and 340 cooperate with the fifth and sixth external elastic members 350 and 360, which will be described later, thereby allowing the second external frame 420 to be horizontally well-balanced when the second external frame 420 is vibrated in the tuning fork mode.

As described above, in order to vibrate the first and second external frames 410 and 420 in tuning fork mode under the condition that the first and second external frames 410 and 420 are horizontally well-balanced, it is preferable that the first and second external elastic members 310 and 320 have symmetrical structures with each other with respect to the Y-axis and the third and fourth external elastic members 330 and 340 have symmetrical structures with each other with respect to the Y-axis. In the MEMS gyroscope of the present invention, the term "symmetrical structures" of the first and second external elastic members 310 and 320 or the third and fourth external elastic members 330 and 340 denote that the shapes, sizes, densities, and stiffnesses of the first and second external elastic members 310 and 320 or the third and fourth external elastic members 330 and 340 are identical to each other.

In order to more synchronously vibrate the first external frame 410 and the second external frame 420 in the tuning fork mode, it is preferable that the first and third external elastic members 310 and 330 have symmetrical structures with each other with respect to the X-axis and the second and fourth external elastic members 320 and 340 have symmetrical structures with each other with respect to the X-axis.

Further, in order to allow the fifth and sixth external elastic members 350 and 360 to cooperate with the first to fourth external elastic members 310 to 140 so as to assure that the first external frame 410 and the second external frame 420 are more stably vibrated in the tuning fork mode, the fifth and sixth external elastic members 350 and 360 have a wine glass shape, and will be described with reference to FIG. 6, as follows.

With reference to FIG. 6, the elastic body of the fifth external elastic member 350 includes a first connection portion 351 having a cup shape, which is opened toward the first Y-axis frame bar 221 of the external fixed support portion 220, and connected to the central part of the inner surface of the first Y-axis frame bar 221, a second connection portion 352 having a cup shape, which is opened toward the second Y-axis frame bar 222 of the external fixed support portion 220, and provided with both ends respectively connected to the first and second external frames 410 and 420, and a third connection portion 353 for connecting the central part of the first connection portion 351 and the central part of the second connection portion 352.

Further, with reference to FIG. 6, the elastic body of the sixth external elastic member 360 includes a first connection portion 361 having a cup shape, which is opened toward the second Y-axis frame bar 222 of the external fixed support portion 220, and connected to the central part of the inner surface of the second Y-axis frame bar 222, a second connection portion 362 having a cup shape, which is opened toward the first Y-axis frame bar 221 of the external fixed support portion 220, and provided with both ends respectively connected to the first and second external frames 410 and 420, and a third connection portion 363 for connecting the central part of the first connection portion 361 and the central part of the second connection portion 362.

Here, in order to vibrate the first and second external frames 410 and 420 in the tuning fork mode under the condition that the first and second external frames 410 and 420 are horizontally well-balanced, it is preferable that the fifth and sixth external elastic members 350 and 360 have symmetrical structures with each other with respect to the Y-axis.

Further, in order to vibrate the first and second external frames 410 and 420 in the tuning fork mode under the condition that the first and second external frames 410 and 420 are correctly synchronous, it is preferable that each of the fifth and sixth external elastic members 350 and 360 has a symmetrical structure with respect to the X-axis.

The first and second external frames 410 and 420 are more stably vibrated in the tuning fork mode by the above fifth and sixth external elastic members 350 and 360, and a detailed description thereof will be achieved later, with reference to FIG. 13.

Figure 7:
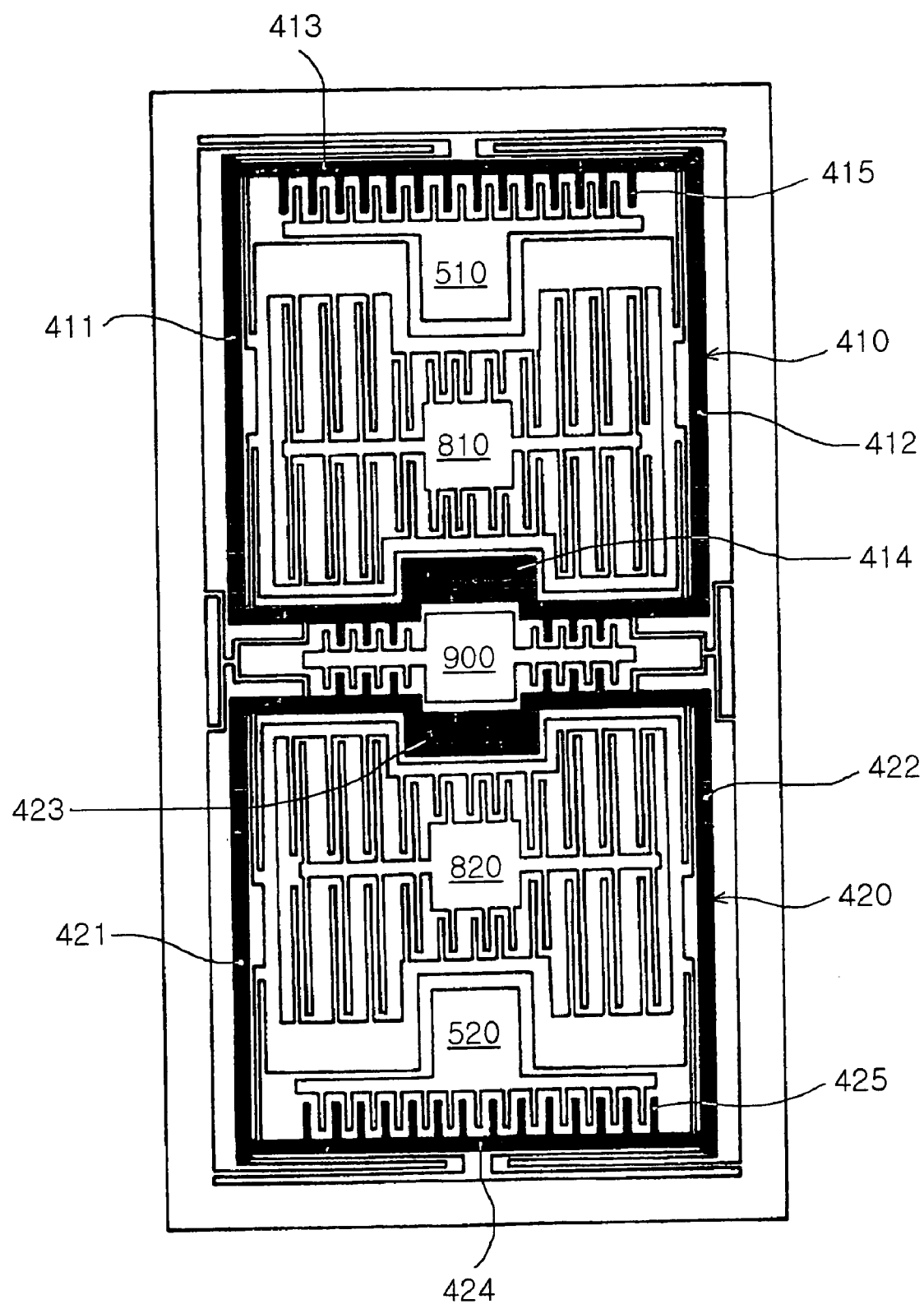
FIG. 7 is a plan view of first and second external frames of the MEMS gyroscope of the present invention.

FIG. 7 is a plan view of the first and second external frames of the MEMS gyroscope of the present invention.

With reference to FIG. 7, the first external frame 410 includes first and second Y-axis frame bars 411 and 412, which are separated from each other and aligned in parallel in the direction of the Y-axis, and first and second X-axis frame bars 413 and 414, which are connected to ends of the first and second Y-axis frame bars 411 and 412, separated from each other, and aligned in parallel in the direction of the X-axis.

Further, the second external frame 420 includes first and second Y-axis frame bars 421 and 422, which are separated from each other and aligned in parallel in the direction of the Y-axis, and first and second X-axis frame bars 423 and 424, which are connected to ends of the first and second Y-axis frame bars 421 and 422, separated from each other, and aligned in parallel in the direction of the X-axis.

The first external frame 410 and the second external frame 420 have symmetrical structures with each other with respect to the X-axis.

Figure 8:
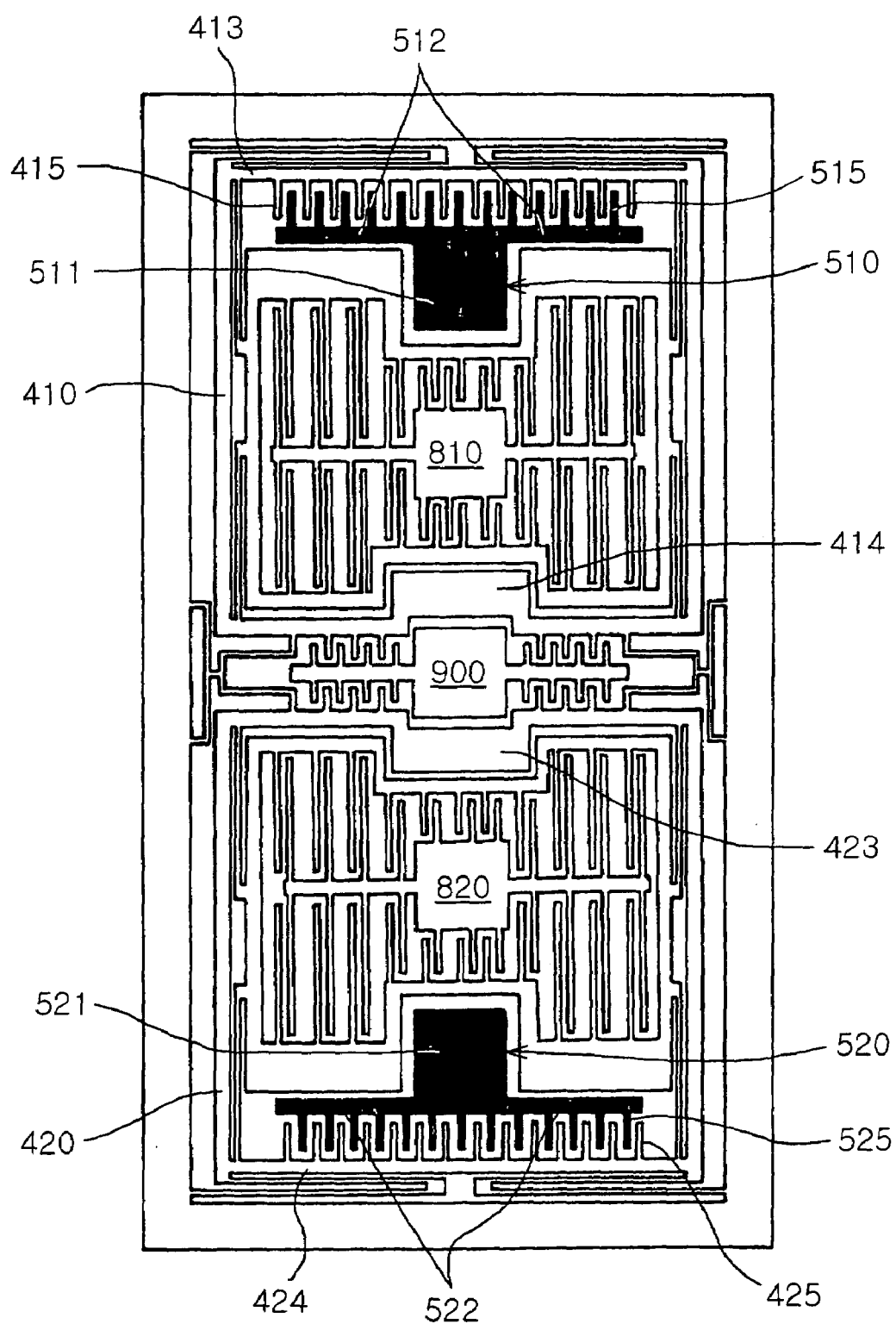
FIG. 8 is a plan view of first and second driving electrodes of the MEMS gyroscope of the present invention.

FIG. 8 is a plan view of the first and second driving electrodes of the MEMS gyroscope of the present invention.

With reference to FIGS. 7 and 8, the driving comb 415 of the first external frame 410 is formed on the first X-axis frame bar 413 of the first external frame 410, and the driving comb 425 of the second external frame 420 is formed on the second X-axis frame bar 424 of the second external frame 420.

Here, the first and second driving electrodes 510 and 520 respectively include driving electrode pads 511 and 521 fixedly supported by the substrate 210, and driving electrode beams 512 and 522 extended from both sides of the driving electrode pads 511 and 521 by a designated length in the direction of the X-axis. The comb drivers 515 and 525 of the first and second driving electrodes 510 and 520 are respectively formed on the driving electrode pads 511 and 521 and the driving electrode beams 512 and 522.

Alternately, the driving comb 415 of the first external frame 410 may be formed on the second X-axis frame bar 414 of the first external frame 410, and the driving comb 425 of the second external frame 420 may be formed on the first X-axis frame bar 423 of the second external frame 420.

Here, the first and second driving electrodes 510 and 520 respectively include driving electrode pads 511 and 521 fixedly supported by the substrate 210, and driving electrode beams 512 and 522 extended from both sides of the driving electrode pads 511 and 521 by a designated length in the direction of the X-axis. The comb drivers 515 and 525 of the first and second driving electrodes 510 and 520 are respectively formed on the driving electrode pads 511 and 521 and the driving electrode beams 512 and 522.

Figure 9:
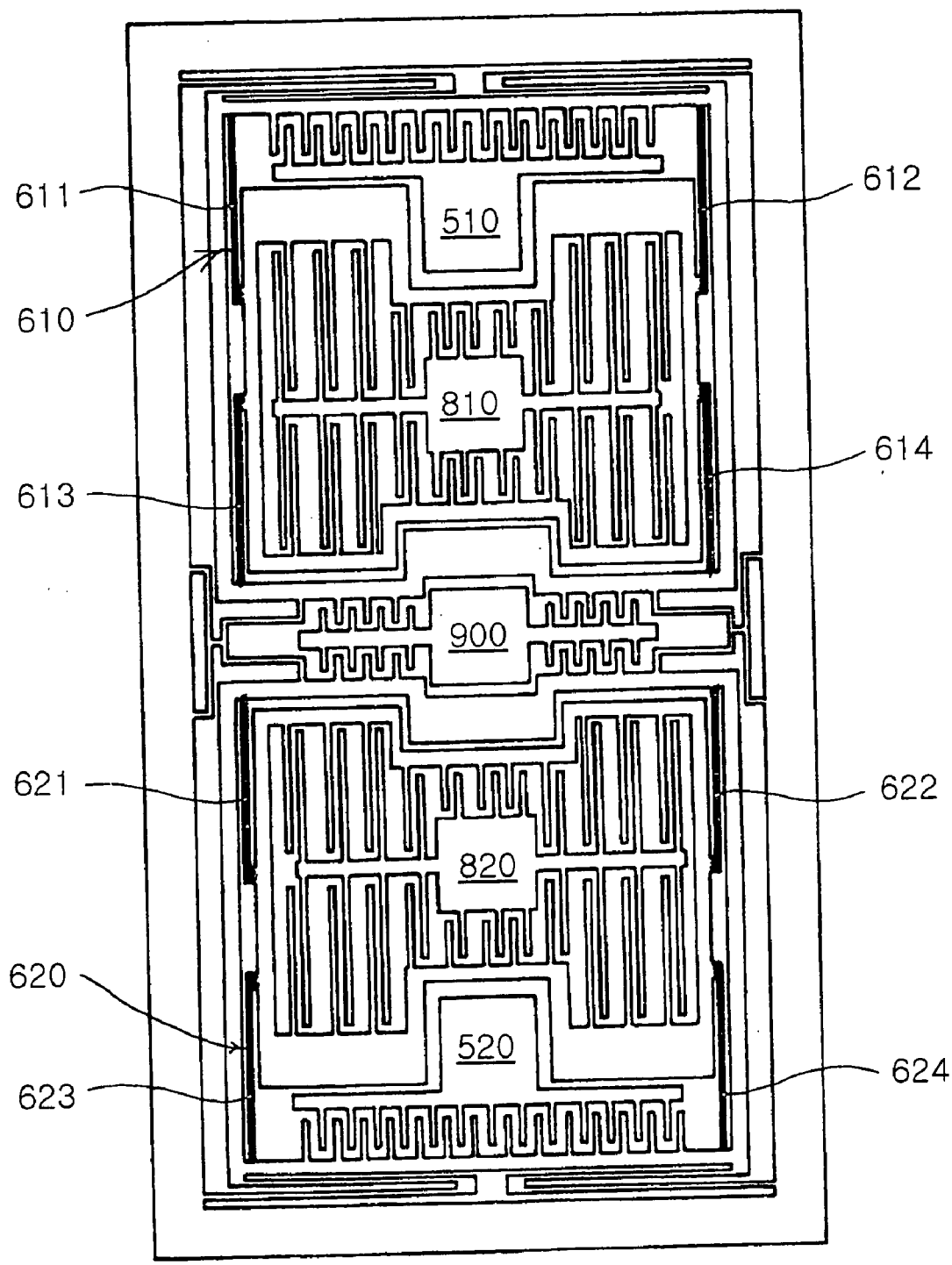
FIG. 9 is a plan view of first and second internal elastic members of the MEMS gyroscope of the present invention.

FIG. 9 is a plan view of the first and second internal elastic members of the MEMS gyroscope of the present invention.

Figure 3:
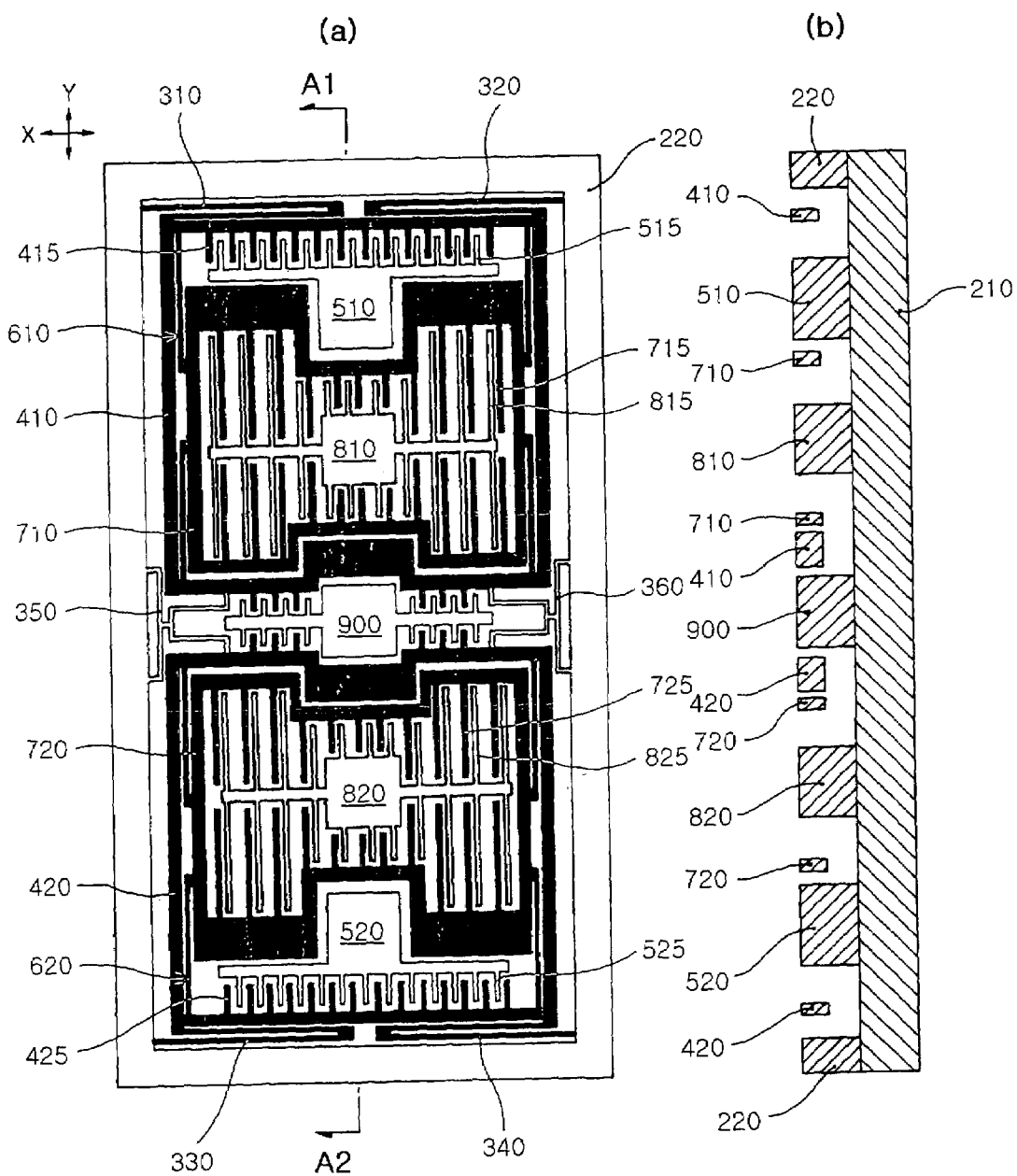
FIG. 3A is an overall plan view of a tuning fork vibratory MEMS gyroscope in accordance with the present invention.
FIG. 3B is a sectional view taken along the ling A1–A2 of FIG. 3A.

With reference to FIGS. 3 and 9, the first internal elastic member 610 includes first and second internal spring members 611 and 612 made of Y-axis bars having a designated length in the direction of the Y-axis, ends of which are connected to the first X-axis frame bar 413 of the first external frame 410 and the other ends of which are connected to the first internal frame 710, and third and fourth internal spring members 613 and 614 made of Y-axis bars having a designated length in the direction of the Y-axis, ends of which are connected to the second X-axis frame bar 414 of the first external frame 410 and the other ends of which are connected to the first internal frame 710.

The first and second internal spring members 611 and 612 have symmetrical structures with each other with respect to the Y-axis, and the third and fourth internal spring members 613 and 614 have symmetrical structures with each other with respect to the Y-axis.

Further, the first and third internal spring members 611 and 613 have symmetrical structures with each other with respect to the X-axis, and the second and fourth internal spring members 612 and 614 have symmetrical structures with each other with respect to the X-axis.

By the above first internal elastic member 610, the first internal frame 710 is vibrated in the direction of the Y-axis in linkage with the first external frame 410 in a driving mode, i.e., a primary resonance mode, and is vibrated in the direction of the X-axis in a sensing mode, i.e., a secondary resonance mode.

Further, with reference to FIGS. 3 and 9, the second internal elastic member 620 includes first and second internal spring members 621 and 622 made of Y-axis bars having a designated length in the direction of the Y-axis, ends of which are connected to the first X-axis frame bar 423 of the second external frame 420 and the other ends of which are connected to the second internal frame 720, and third and fourth internal spring members 623 and 624 made of Y-axis bars having a designated length in the direction of the Y-axis, ends of which are connected to the second X-axis frame bar 424 of the second external frame 420 and the other ends of which are connected to the second internal frame 720.

The first and second internal spring members 621 and 622 have symmetrical structures with each other with respect to the Y-axis, and the third and fourth internal spring members 623 and 624 have symmetrical structures with each other with respect to the Y-axis.

Further, the first and third internal spring members 621 and 623 have symmetrical structures with each other with respect to the X-axis, and the second and fourth internal spring members 622 and 624 have symmetrical structures with each other with respect to the X-axis.

By the above second internal elastic member 620, the second internal frame 720 is vibrated in the direction of the Y-axis in linkage with the second external frame 420 in the driving mode, i.e., the primary resonance mode, and is vibrated in the direction of the X-axis in the sensing mode, i.e., the secondary resonance mode.

Figure 10:
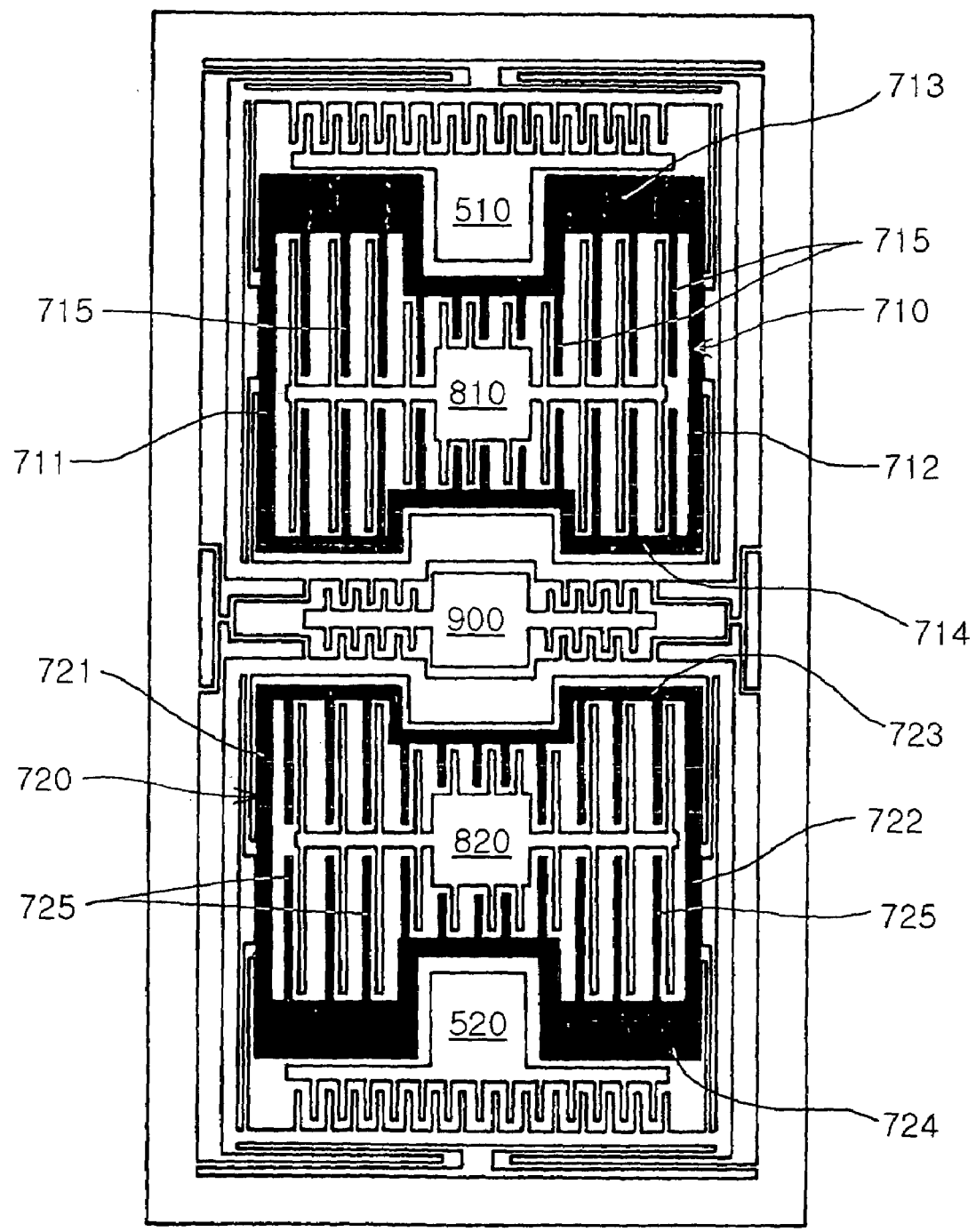
FIG. 10 is a plan view of first and second internal frames of the MEMS gyroscope of the present invention.
Figure 11:
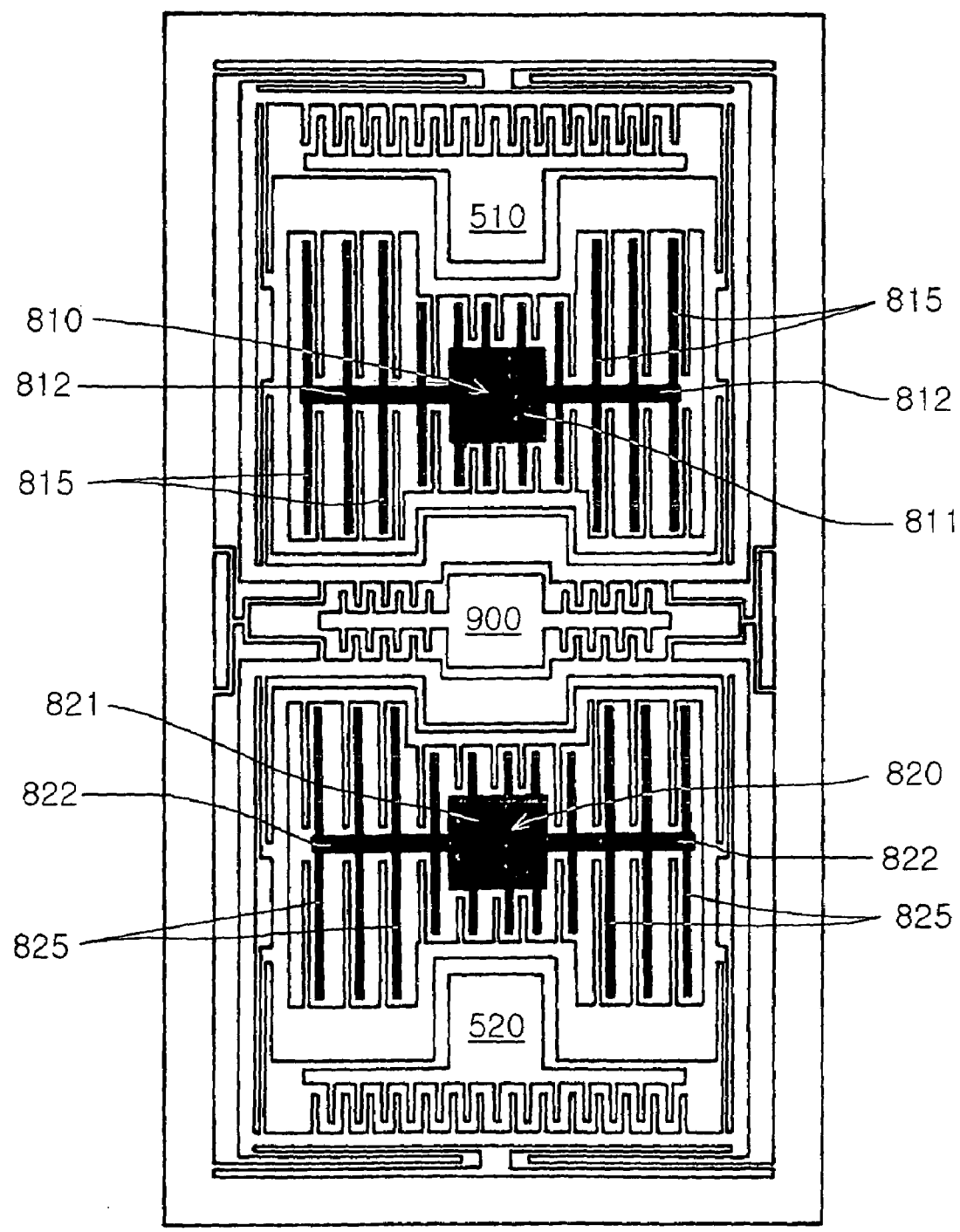
FIG. 11 is a plan view of first and second sensing electrodes of the MEMS gyroscope of the present invention.

FIG. 10 is a plan view of the first and second internal frames of the MEMS gyroscope of the present invention, and FIG. 11 is a plan view of the first and second sensing electrodes of the MEMS gyroscope of the present invention.

With reference to FIG. 10, the first internal frame 710 includes first and second Y-axis frame bars 711 and 712, which are separated from each other and aligned in parallel in the direction of the Y-axis, and first and second X-axis frame bars 713 and 714, which are connected to ends of the first and second Y-axis frame bars 711 and 712, separated from each other, and aligned in parallel in the direction of the X-axis.

Further, the second internal frame 720 includes first and second Y-axis frame bars 721 and 722, which are separated from each other and aligned in parallel in the direction of the Y-axis, and first and second X-axis frame bars 723 and 724, which are connected to ends of the first and second Y-axis frame bars 721 and 722, separated from each other, and aligned in parallel in the direction of the X-axis.

Further, with reference to FIG. 10, the sensing comb 715 of the first internal frame 710 is formed on the first and second X-axis frame bars 713 and 714 of the first internal frame 710, and the sensing comb 725 of the second internal frame 720 is formed on the first and second X-axis frame bars 723 and 724 of the second internal frame 720.

Here, with reference to FIG. 11, the first sensing electrode 810 includes a sensing electrode pad 811 fixedly supported by the substrate 210, and a sensing electrode bar 812 extended from both sides of the sensing electrode pad 811 by a designated length in the direction of the X-axis. The comb sensor 815 of the first sensing electrode 810 is formed on the sensing electrode pad 811 and the sensing electrode bar 812.

Further, the second sensing electrode 820 includes a sensing electrode pad 821 fixedly supported by the substrate 210, and a sensing electrode bar 822 extended from both sides of the sensing electrode pad 821 by a designated length in the direction of the X-axis. The comb sensor 825 of the second sensing electrode 820 is formed on the sensing electrode pad 821 and the sensing electrode bar 822.

The above structure maximizes the sensing capacity of the MEMS gyroscope of the present invention, and may be variously modified, as follows.

In accordance with one modified embodiment, the sensing comb 715 of the first internal frame 710 is formed only on the first X-axis frame bar 713 of the first internal frame 710, and the sensing comb 725 of the second internal frame 720 is formed only on the second X-axis frame bar 724 of the second internal frame 720.

In accordance with another embodiment, the sensing comb 715 of the first internal frame 710 is formed only on the second X-axis frame bar 714 of the first internal frame 710, and the sensing comb 725 of the second internal frame 720 is formed only on the first X-axis frame bar 723 of the second internal frame 720.

When the first and second internal frame 710 and 720 are secondarily vibrated in the direction of the X-axis, an interval between the sensing comb 715 of the first internal frame 710 and the comb sensor 815 of the first sensing electrode 810 varies, and an interval between the sensing comb 725 of the second internal frame 720 and the comb sensor 825 of the second sensing electrode 820 varies. The first and second sensing electrodes 810 and 820 detect capacitances corresponding to the variations of the intervals, thereby sensing the movement of a movable body, such as hand-held trembling of a digital camera.

Figure 12:
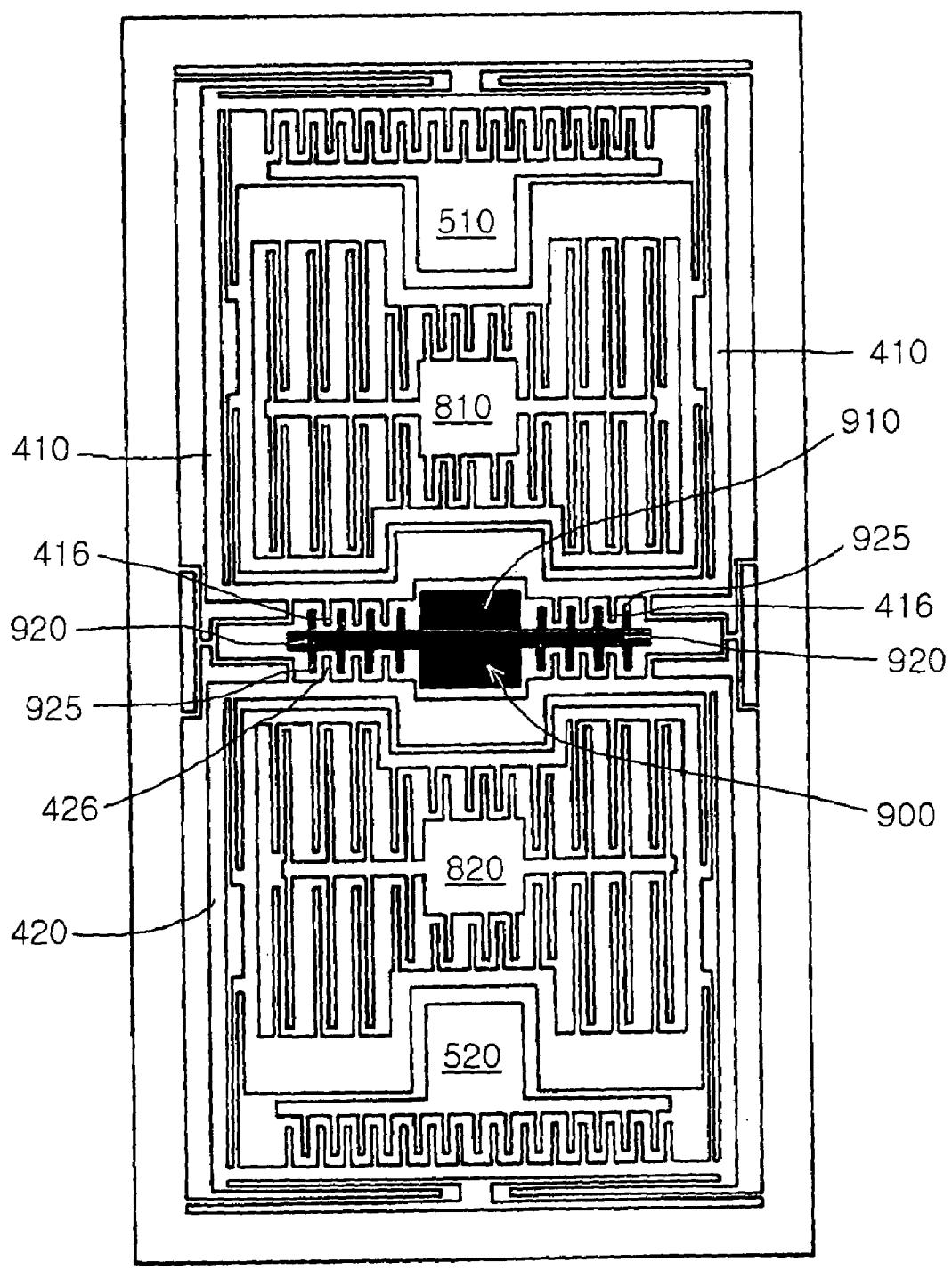
FIG. 12 is a plan view of a feedback electrode of the MEMS gyroscope of the present invention.

FIG. 12 is a plan view of the feedback electrode of the MEMS gyroscope of the present invention.

With reference to FIG. 12, the first and second external frame 410 and 420 further includes a plurality of feedback sensing combs 416 and 426 formed on the neighboring two X-axis frame bars 414 and 423, out of the X-axis frame bars of the first and second external frames 410 and 420, in the direction of the Y-axis.

Here, the MEMS gyroscope of the present invention further comprises the feedback electrode 900 formed between the first and second external frames 410 and 420 for sensing capacitances corresponding to the intervals with the feedback sensing combs 416 and 426 of the first and second external frames 410 and 420.

The feedback electrode 900 includes a feedback electrode pad 910 fixed to the substrate 210, a feedback electrode beam 920 extended from both sides of the feedback electrode pad 910 in the direction of the X-axis, and a feedback comb sensor 925 having fingers continuously aligned on the feedback electrode pad 910 and the feedback electrode beam 920 in the direction of the Y-axis, separated from the feedback sensing combs 416 and 426 of the first and second external frames 410 and 420, and engaged with the feedback sensing combs 416 and 426.

Here, the feedback electrode 900 senses the capacitances corresponding to the variations of the intervals between the feedback sensing combs 416 and 426 of the first and second external frames 410 and 420 and the feedback comb sensors 925, thereby detecting the driving operations of the first and second external frames 410 and 420.

Figure 13:
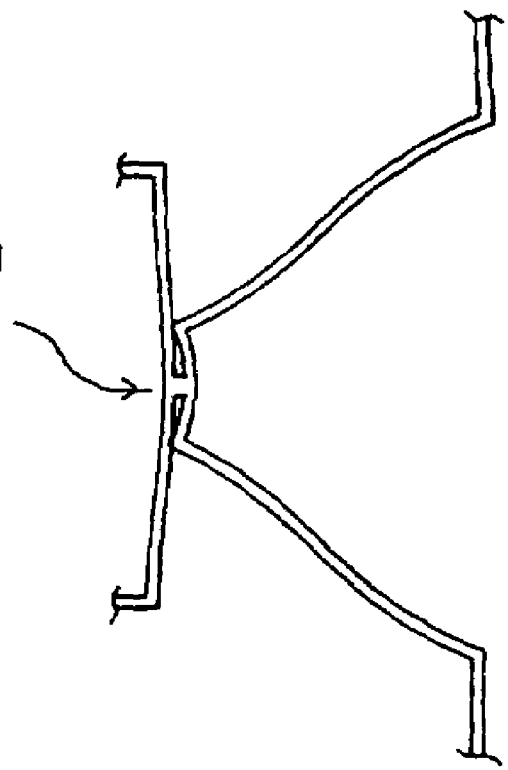
FIG. 13 is a schematic view illustrating a "π"-shaped spring in a tuning fork mode of the MEMS gyroscope of the present invention.

FIG. 13 is a schematic view illustrating a "π"-shaped spring in the tuning fork mode of the MEMS gyroscope of the present invention.

Figure 2:
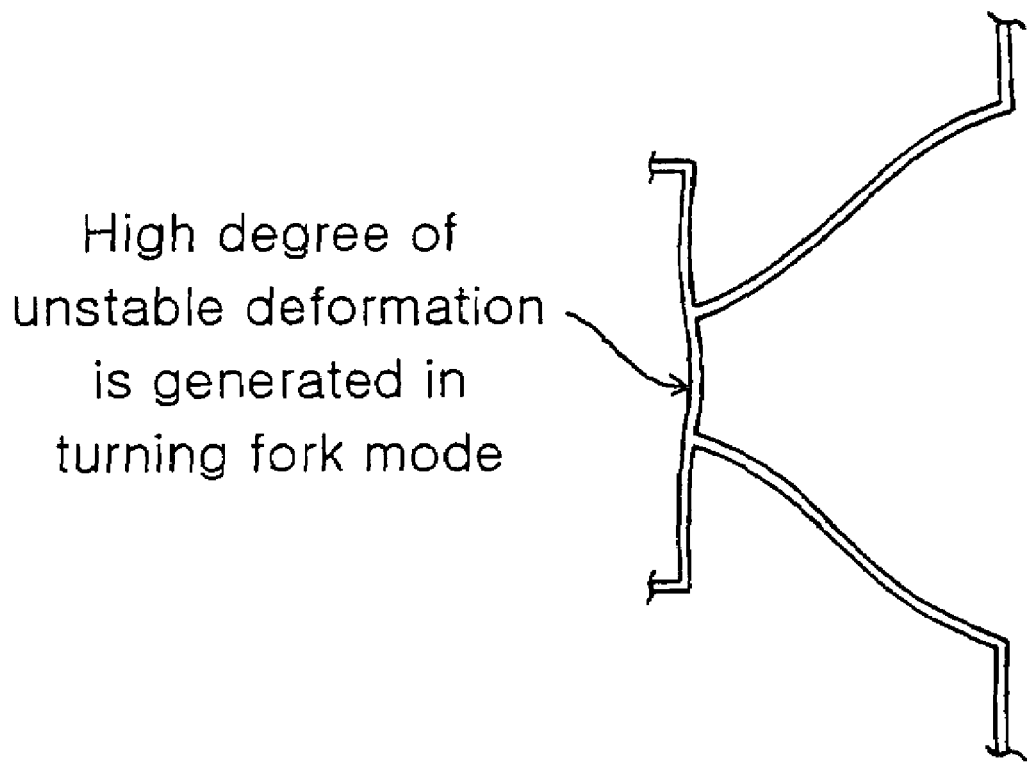
FIG. 2 is a schematic view illustrating a "π"-shaped spring in a tuning fork mode of the gyroscope of FIG. 1.

The deformation of the central portion of the wine glass-shaped external elastic member, as shown in FIG. 13, of the MEMS gyroscope of the present invention, which is in the tuning fork mode, i.e., the primary resonance mode, is lower than that of the wine glass-shaped external elastic member, as shown in FIG. 2, of the conventional gyroscope. Accordingly, with the wine glass-shaped external elastic members, the MEMS gyroscope of the present invention can be more correctly vibrated in the tuning fork mode.

As apparent from the above description, the present invention provides a tuning fork vibratory MEMS gyroscope for sensing angular velocity and angular acceleration generated due to the rotation of a movable body, which withstands a noise at a peripheral area, is driven at the external portions of internal frames, is sensed at the internal portions of the internal frames, and comprises elastic members having a wine glass shape, and a feedback electrode formed between the wine glass-shaped elastic members so as to increase space utility, thereby being reduced in size and being more stably operated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A tuning fork vibratory MEMS gyroscope comprising:
    an external fixed support portion formed on a substrate having a flat structure in a horizontal direction by the X-axis and the Y-axis, which meet at a right angle, wherein the external fixed support portion includes:

first and second Y-axis frame bars separated from each other and aligned in parallel in the direction of the Y-axis, and first and second X-axis frame bars connected to both ends of the first and second Y-axis frame bars, separated from each other, and aligned in parallel in the direction of the X-axis;
    a plurality of external elastic members connected to inner sides of the external fixed support portion, and having elasticity in the direction of the Y-axis, wherein the plurality of external elastic members include:
    first and second external elastic members respectively made of elastic bars having a designated length in the direction of the X-axis, ends of which are connected to the inner sides of the external fixed support portion and other ends of which are connected to a first external frame,
    third and fourth external elastic members respectively made of elastic bars having a designated length in the direction of the X-axis, ends of which are connected to the inner sides of the external fixed support portion and other ends connected to a second external frame,
    a fifth external elastic member made of an elastic body having a right-laid wine glass shape, both ends of a left side of which are connected to a central part of an inner surface of the first Y-axis frame bar of the external fixed support portion and both ends of a right side of which are respectively connected to the first and second external frames of the external fixed support portion, and
    a sixth external elastic member made of an elastic body having a left-laid wine glass shape, both ends of a right side of which are connected to a central part of an inner surface of the second Y-axis frame bar of the external fixed support portion and both ends of a left side of which are respectively connected to the first and second external frames of the external fixed support portion;
    wherein the first and second external frames are separated from the substrate by a designated interval, are elastically supported by the plurality of external elastic members, are disposed on the Y-axis such that the first and second external frames are separated from each other, and respectively include driving combs having a designated length in the direction of the Y-axis, at a part of an inner surface of the respective first and second external frames;
    first and second driving electrodes fixed to the substrate, respectively disposed inside the first and second external frames such that the first and second driving electrodes are separated from the inner sides of the first and second external frames, and respectively including comb drivers separated from the corresponding driving combs and engaged with the corresponding driving combs;
    first and second internal elastic members respectively connected to the inner sides of the first and second external frames, and having elasticity in the direction of the X-axis;
    first and second internal frames separated from the substrate by a designated interval, respectively disposed inside the first and second external frames such that the first and second internal frames are separated from the inner sides of the first and second external frames, elastically supported by the first and second internal elastic members, and respectively including sensing combs having a designated length in the direction of the Y-axis, at a part of inner sides of the first and second internal frames, respectively; and
    first and second sensing electrodes fixed to the substrate, respectively disposed inside the first and second internal frames such that the first and second sensing electrodes are separated from inner sides of the first and second internal frames, and respectively including comb sensors separated from the corresponding sensing combs by a designated interval and engaged with the corresponding sensing combs.

2. The tuning fork vibratory MEMS gyroscope as set forth in claim 1,
wherein the first and second external elastic members have symmetrical structures with each other with respect to the Y-axis.

3. The tuning fork vibratory MEMS gyroscope as set forth in claim 2,
wherein the third and fourth external elastic members have symmetrical structures with each other with respect to the Y-axis.

4. The tuning fork vibratory MEMS gyroscope as set forth in claim 3,
wherein the fifth and sixth external elastic members have symmetrical structures with each other with respect to the Y-axis.

5. The tuning fork vibratory MEMS gyroscope as set forth in claim 4,
wherein the fifth and third external elastic members have symmetrical structures with each other with respect to the X-axis.

6. The tuning fork vibratory MEMS gyroscope as set forth in claim 5,
wherein the second and fourth external elastic members have symmetrical structures with each other with respect to the X-axis.

7. The tuning fork vibratory MEMS gyroscope as set forth in claim 6,
wherein each of the fifth and sixth external elastic members has a symmetrical structure with respect to the X-axis.

8. The tuning fork vibratory MEMS gyroscope as set forth in claim 7, wherein the elastic body of the fifth external elastic member includes:
a first connection portion having a cup shape, which is opened toward the first Y-axis frame bar of the external fixed support portion, and connected to the central part of the inner surface of the first Y-axis frame bar;
a second connection portion having a cup shape, which is opened toward the second Y-axis frame bar of the external fixed support portion, and provided with both ends respectively connected to the first and second external frames; and
a third connection portion for connecting the central part of the first connection portion and the central part of the second connection portion.

9. The tuning fork vibratory MEMS gyroscope as set forth in claim 7, wherein the elastic body of the sixth external elastic member includes:
a first connection portion having a cup shape, which is opened toward the second Y-axis frame bar of the external fixed support portion, and connected to the central part of the inner surface of the second Y-axis frame bar;
a second connection portion having a cup shape, which is opened toward the first Y-axis frame bar of the external fixed support portion, and provided with both ends respectively connected to the first and second external frames; and
a third connection portion for connecting the central part of the first connection portion and the central part of the second connection portion.

10. The tuning fork vibratory MEMS gyroscope as set forth in claim 1, wherein each of the first and second external frames respectively includes:
first and second Y-axis frame bars separated from each other and aligned in parallel in the direction of the Y-axis; and
first and second X-axis frame bars connected to ends of the first and second Y-axis frame bars, separated from each other, and aligned in parallel in the direction of the X-axis.

11. The tuning fork vibratory MEMS gyroscope as set forth in claim 10,
wherein the driving comb of the first external frame is formed on the first X-axis frame bar of the first external frame, and the driving comb of the second external frame is formed on the second X-axis frame bar of the second external frame.

12. The tuning fork vibratory MEMS gyroscope as set forth in claim 11, wherein each of the first and second driving electrodes further includes:
a driving electrode pad fixedly supported by the substrate; and
a driving electrode beam extended from both sides of the driving electrode pad by a designated length in the direction of the X-axis,
wherein the comb drivers of the first and second driving electrodes are respectively formed on the driving electrode pads and the driving electrode beams.

13. The tuning fork vibratory MEMS gyroscope as set forth in claim 10, wherein the driving comb of the first external frame is formed on the second X-axis frame bar of the first external frame, and the driving comb of the second external frame is formed on the first X-axis frame bar of the second external frame.

14. The tuning fork vibratory MEMS gyroscope as set forth in claim 13, wherein each of the first and second driving electrodes further includes:
a driving electrode pad fixedly supported by the substrate; and
a driving electrode beam extended from both sides of the driving electrode pad by a designated length in the direction of the X-axis,
wherein the comb drivers of the first and second driving electrodes are respectively formed on the driving electrode pads and the driving electrode beams.

15. The tuning fork vibratory MEMS gyroscope as set forth in claim 10, wherein the first internal elastic member includes:
first and second internal spring members respectively made of Y-axis bars having a designated length in the direction of the Y-axis, ends of which are connected to the first X-axis frame bar of the first external frame and the other ends of which are connected to the first internal frame; and
third and fourth internal spring members respectively made of Y-axis bars having a designated length in the direction of the Y-axis, ends of which are connected to the second X-axis frame bar of the first external frame and the other ends of which are connected to the first internal frame.

16. The tuning fork vibratory MEMS gyroscope as set forth in claim 15, wherein the first and second internal spring members have symmetrical structures with each other with respect to the Y-axis, and the third and fourth internal spring members have symmetrical structures with each other with respect to the Y-axis.

17. The tuning fork vibratory MEMS gyroscope as set forth in claim 15, wherein the first and third internal spring members have symmetrical structures with each other with respect to the X-axis, and the second and fourth internal spring members have symmetrical structures with each other with respect to the X-axis.

18. The tuning fork vibratory MEMS gyroscope as set forth in claim 10, wherein the second internal elastic member includes:
   first and second internal spring members respectively made of Y-axis bars having a designated length in the direction of the Y-axis, ends of which are connected to the first X-axis frame bar of the second external frame and the other ends of which are connected to the second internal frame; and
   third and fourth internal spring members respectively made of Y-axis bars having a designated length in the direction of the Y-axis, ends of which are connected to the second X-axis frame bar of the second external frame and the other ends of which are connected to the second internal frame.

19. The tuning fork vibratory MEMS gyroscope as set forth in claim 18, wherein the first and second internal spring members have symmetrical structures with each other with respect to the Y-axis, and the third and fourth internal spring members have symmetrical structures with each other with respect to the Y-axis.

20. The tuning fork vibratory MEMS gyroscope as set forth in claim 18, wherein the first and third internal spring members have symmetrical structures with each other with respect to the X-axis, and the second and fourth internal spring members have symmetrical structures with each other with respect to the X-axis.

21. The tuning fork vibratory MEMS gyroscope as set forth in claim 1, wherein each of the first and second internal frames includes:
   first and second Y-axis frame bars separated from each other and aligned in parallel in the direction of the Y-axis; and
   first and second X-axis frame bars connected to ends of the first and second Y-axis frame bars, separated from each other, and aligned in parallel in the direction of the X-axis.

22. The tuning fork vibratory MEMS gyroscope as set forth in claim 21, wherein the sensing comb of the first internal frame is formed on the first X-axis frame bar of the first internal frame, and the sensing comb of the second internal frame is formed on the second X-axis frame bar of the second internal frame.

23. The tuning fork vibratory MEMS gyroscope as set forth in claim 22, wherein the first sensing electrode includes:
   a sensing electrode pad fixedly supported by the substrate; and
   a sensing electrode bar extended from both sides of the sensing electrode pad by a designated length in the direction of the X-axis,
   wherein the comb sensor of the first sensing electrode is formed on the sensing electrode pad and the sensing electrode bar.

24. The tuning fork vibratory MEMS gyroscope as set forth in claim 23, wherein the second sensing electrode includes:
   a sensing electrode pad fixedly supported by the substrate; and
   a sensing electrode bar extended from both sides of the sensing electrode pad by a designated length in the direction of the X-axis,
   wherein the comb sensor of the second sensing electrode is formed on the sensing electrode pad and the sensing electrode bar.

25. The tuning fork vibratory MEMS gyroscope as set forth in claim 21, wherein the sensing comb of the first internal frame is formed on the second X-axis frame bar of the first internal frame, and the sensing comb of the second internal frame is formed on the first X-axis frame bar of the second internal frame.

26. The tuning fork vibratory MEMS gyroscope as set forth in claim 25, wherein the first sensing electrode includes:
   a sensing electrode pad fixedly supported by the substrate; and
   a sensing electrode bar extended from both sides of the sensing electrode pad by a designated length in the direction of the X-axis,
   wherein the comb sensor of the first sensing electrode is formed on the sensing electrode pad and the sensing electrode bar.

27. The tuning fork vibratory MEMS gyroscope as set forth in claim 26, wherein the second sensing electrode includes:
   a sensing electrode pad fixedly supported by the substrate; and
   a sensing electrode bar extended from both sides of the sensing electrode pad by a designated length in the direction of the X-axis,
   wherein the comb sensor of the second sensing electrode is formed on the sensing electrode pad and the sensing electrode bar.

28. The tuning fork vibratory MEMS gyroscope as set forth in claim 21, wherein the sensing comb of the first internal frame is formed on the first and second X-axis frame bars of the first internal frame, and the sensing comb of the second internal frame is formed on the first and second X-axis frame bars of the second internal frame.

29. The tuning fork vibratory MEMS gyroscope as set forth in claim 28, wherein the first sensing electrode includes:
   a sensing electrode pad fixedly supported by the substrate; and
   a sensing electrode bar extended from both sides of the sensing electrode pad by a designated length in the direction of the X-axis,
   wherein the comb sensor of the first sensing electrode is formed on the sensing electrode pad and the sensing electrode bar.

30. The tuning fork vibratory MEMS gyroscope as set forth in claim 29, wherein the second sensing electrode includes:
   a sensing electrode pad fixedly supported by the substrate; and
   a sensing electrode bar extended from both sides of the sensing electrode pad by a designated length in the direction of the X-axis,
   wherein the comb sensor of the second sensing electrode is formed on the sensing electrode pad and the sensing electrode bar.

31. The tuning fork vibratory MEMS gyroscope as set forth in claim 1, wherein each of the first and second external frames further includes a plurality of feedback sensing combs aligned on the neighboring two X-axis frame bars, out of the X-axis frame bars of the first and second external frames, in the direction of the Y-axis.

32. The tuning fork vibratory MEMS gyroscope as set forth in claim 31, further comprising a feedback electrode formed between the first and second external frames for sensing capacitances corresponding to intervals with the feedback sensing combs of the first and second external frames.

33. The tuning fork vibratory MEMS gyroscope as set forth in claim 32, wherein the feedback electrode includes:

a feedback electrode pad fixed to the substrate;

a feedback electrode beam extended from both sides of the feedback electrode pad in the direction of the X-axis; and a feedback comb sensor having fingers continuously aligned on the feedback electrode pad and the feedback electrode beam in the direction of the Y-axis, separated from the feedback sensing combs of the first and second external frames, and engaged with the feedback sensing combs.

\* \* \* \* \*